US00RE42411E

(19) United States
(12) Reissued Patent
Ayoub et al.

(10) Patent Number: US RE42,411 E
(45) Date of Reissued Patent: May 31, 2011

(54) PROCEDURE AND SYSTEM FOR POSITION MANAGEMENT IN A MOBILE TELEPHONE SYSTEM

(76) Inventors: Souhad Ayoub, Kista (SE); Michael Andersin, Taby (SE)

(21) Appl. No.: 11/316,599

(22) PCT Filed: Dec. 17, 1998

(86) PCT No.: PCT/SE98/02357

§ 371 (c)(1),
(2), (4) Date: Sep. 6, 2000

(87) PCT Pub. No.: WO99/33305

PCT Pub. Date: Jul. 1, 1999

Related U.S. Patent Documents

Reissue of:
(64) Patent No.: 6,668,171
Issued: Dec. 23, 2003
Appl. No.: 09/582,170
Filed: Sep. 6, 2000

(30) Foreign Application Priority Data

Dec. 23, 1997 (SE) ..... 9704863

(51) Int. Cl.
*H04Q 7/20* (2006.01)

(52) U.S. Cl. ..... 455/441; 455/440; 370/252; 370/465

(58) Field of Classification Search ..... 455/440, 455/441, 550.1, 553.1, 466, 343, 426.1, 345; 370/252, 465, 341
See application file for complete search history.

(56) References Cited

U.S. PATENT DOCUMENTS

| | | | | |
|---|---|---|---|---|
| 5,745,695 | A | 4/1998 | Gilchrist et al. | |
| 6,009,325 | A * | 12/1999 | Retzer et al. | 455/434 |
| 6,032,050 | A * | 2/2000 | Hasegawa | 455/517 |
| 6,104,929 | A * | 8/2000 | Josse et al. | 455/445 |
| 6,243,579 | B1 * | 6/2001 | Kari | 455/426.1 |
| 6,512,756 | B1 * | 1/2003 | Mustajarvi et al. | 370/341 |

FOREIGN PATENT DOCUMENTS

| | | |
|---|---|---|
| GB | 2 43 976 | 11/1991 |
| GB | 2 243 976 | 11/1991 |
| WO | WO 94/13114 | 6/1994 |
| WO | WO 94/133114 | 6/1994 |
| WO | WO 97/37504 | 10/1997 |

OTHER PUBLICATIONS

International Preliminary Examination Report issued in Application No. PCT/SE98/02357; dated Mar. 16, 2000; 3 pgs.
International Search Report issued in Application No. PCT/SE98/02357; dated Jun. 15, 1999; 4 pgs.

* cited by examiner

*Primary Examiner* — Sujatha Sharma
(74) *Attorney, Agent, or Firm* — Foley & Lardner LLP

(57) ABSTRACT

A device, a system and a procedure to reduce the signalling load in a cellular mobile telephone system that supports packet switched services. One of a set of mobile stations included in a cellular mobile telephone system is switched between a first mode in a first state, here called Ready State, respective to a second state, here called Standby State, depending on a time parameter which indicates a time when the mobile station shall remain in the first state, to switch to the second state afterward. The value of the time parameter is set currently depending on the current speed of the mobile station through the cell network of the mobile telephone system.

49 Claims, 3 Drawing Sheets

PROCEDURE AND SYSTEM FOR POSITION MANAGEMENT IN A MOBILE TELEPHONE SYSTEM

Matter enclosed in heavy brackets [ ] appears in the original patent but forms no part of this reissue specification; matter printed in italics indicates the additions made by reissue.

The present invention relates to a method and a system for position management of mobile stations in a cellular mobile telephone system.

BACKGROUND OF THE INVENTION

In order to get possibility to connect incoming calls or transmit data to a mobile station in a cellular mobile system, it is very important that the system can locate or determine the position for the mobile station. The procedure or the function to keep count of the position of a mobile station within the mobile system is in the trade called "Location Management", which in this text is called position management. Position management requires signalling via radio, which consequently implies that a certain part of the total radio capacity in a cellular system is needed for this type of signalling, which here for the sake of convenience is called position signalling. In order to make most possible share of the limited radio capacity possible to use for voice respective data traffic, the position management must be optimized so that it takes a minimum of the available radio resource. The degree of difficulty of the optimizing problem is increased by the fact that the mobile stations are just, as the name indicates, mobile.

In prior art the strategy for position management is to find a suitable compromise between signalling in uplink, i.e. from the mobile station to one in the mobile system permanent installed network of base stations, and signalling in downlink, i.e. from the network of base stations to a mobile station. Signalling in downlink is normally executed by searching, also called "paging", whereby a signalling message is transmitted from the network, to search for a mobile station in a limited area, a so called "Routing Area" (RA) which consists of one or more cells. Signalling in uplink is executed by a mobile station at intervals transmitting a message to the network, which by that can keep count of where the mobile station is at the moment. Updating of the position of the mobile station is made on one hand at change of cell, which is called "Cell Update" (CU), and on the other at change of Routing Area, which in its turn consequently is called "Routing Area Update" (RAU).

In a mobile telephone system which supports packet switched services, for instance according to the specification which in English is called General Packet Radio Service and is abbreviated GPRS, the capacity and the radio resource is utilized in a comparatively cost efficient way. This is due to the fact that a given GPRS mobile station utilizes a radio channel only when there are data that shall be transmitted or received by this mobile station. In GPRS there are specified three states of a mobile station. i.e. "Idle State", "Ready State" and "Standby State", at which there are different operations for position management at each of the different states. In the Idle State, the mobile station is not connected to the network, and the network therefore has no information about the position of the mobile station. When the mobile station is in Ready State or in Standby State, it can, on the contrary, receive paging messages and it also can execute Routing Area Update (RAU), respective Cell Update (CU).

When the mobile station is in Ready State and it changes cell, a Cell Update (CU) is executed if the cells belong to the same routing area. If the new cell which the mobile station enters into also belongs to a new routing area, a Cell Update (CU) is executed combined with a Route Area Update (RAU). In the Ready State there are in fact two "sub-states". Firstly "Receive/Transfer Mode", i.e. receiving/transmission mode, which is the state that usually is used at reception respective transmission of voice respective data traffic. Secondly, "Wait Mode", which implies one by a time parameter limited waiting state, at which the time parameter indicates a time during which the mobile station shall remain in Ready State/Wait Mode in order to later switch to Standby State. At Standby State only Routing Area Update (RAU) is executed when the mobile station changes routing area.

Prior Art

The signalling load which is to be referred to the position management depends on the size of the routing area, and the time which the time parameter indicates. Within known technology there has since a long time been attempts at minimizing this signalling load by means of optimization of the size of the routing area.

The Aim of the Invention

An aim of the invention and the overall problem to be solved is to further minimize the signalling load which depends on he position management. One in this context new problem, which is an aspect of said overall problem, is to determine a time parameter which at each state of the mobile station minimizes the position management depending signalling load.

SUMMARY OF THE INVENTION

The invention is based on the understanding that the problem can be solved by setting the value of the time parameter in relation to the speed of a mobile through a cell network.

If the mobile station is stationary or is moving slowly, in the cell network, the time parameter is, according to the invention, set at a comparatively high value. This results in that the mobile station will for a longer time be in the Ready State and no paging need to be executed, because the network knows exactly in which cell the mobile station is. The paging signalling, i.e, the signalling in downlink, therefore is significantly reduced. Because the mobile station is stationary, or only moving slowly, no or very low frequent Cell Updates (CU) are needed, which consequently results in low signalling also in uplink.

If, on the other hand, the mobile station is moving rapidly through cell network, the time parameter is, according to the invention, set at a comparatively small value. This in its turn results in that the mobile station is in Ready State during a shorter time, and instead more rapidly changes into the Standby State. This also results in a lower number of Cell Updates (CU) and, when necessary, Routing Area Updates (RAU) are executed, which consequently results in reduced signalling in uplink.

Consequently the above mentioned problem is solved by the time parameter which controls the time during which a mobile station is in Ready State/Wait Mood being set adaptively depending on the present speed of a mobile station through a cell network.

BRIEF DESCRIPTION OF FIGURES

The invention now will be explained by means of different embodiments and with reference to enclosed figures in which.

DETAILED DESCRIPTION OF EMBODIMENTS

Figure 1:
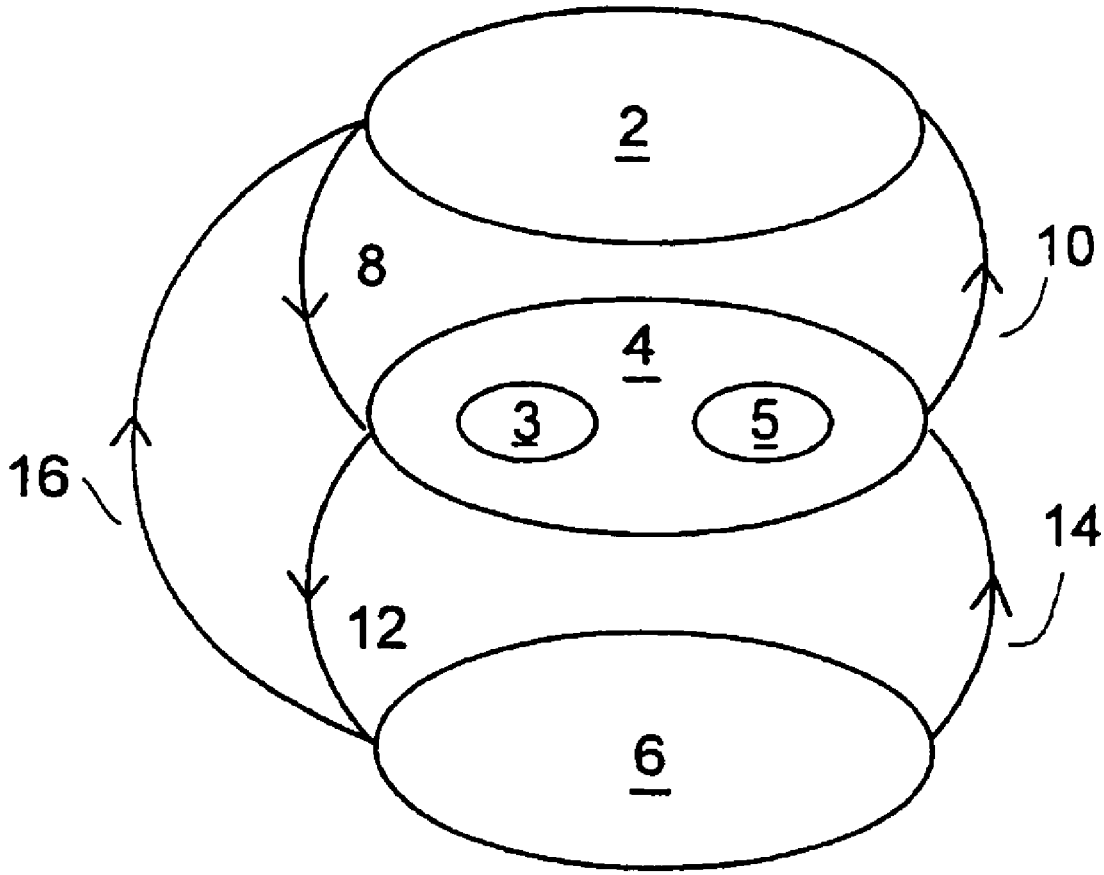
FIG. 1 illustrates a simplified state diagram for a mobile station in a GPRS-system.

Procedure:

One embodiment of the invention consists of a procedure to reduce the signalling load in a cellular mobile telephone system which supports packet switched services. One in the mobile telephone system included mobile station is switched between a first mode in a first state, here called Ready State, respective a second state, here called Standby State, depending on time parameter which indicates a time during which the mobile station shall remain in the first state in order to, after that, change to the second state. FIG. 1 shows a simplified state diagram for such a mobile station, which can take an "Idle State", 2, a "Ready State" 4, and a "Standby State" 6. The Ready State includes 2 modes, that is "Wait Mode" 3, respective "Receive/Transfer"-mode 5. The mobile station changes at a GPRS-connection 8 from the Idle State 2, to the Ready State 4, and at a GPRS-disconnection 10 from the Ready State 4, back to the Idle State 2. The mobile station is in Ready State/Wait Mode 4/3 during an adjustable time which is controlled by said time parameter, and changes state at a change 12 to the Standby State 6 at the expiration of the set time. At transmission or at signalling about incoming voice or data traffic, the mobile station changes state in a change 14 to the Ready State 4 and Receive/Transfer Mode 5.

There also may be a time circuit for control of the duration of the Standby State 6 of the mobile station, and at the expiration of a pre-set standby time, the mobile station changes state in a change 16 to the Idle State 2.

As has been explained in the description of the background of the invention signalling are, in the different states, executed which can be related to determining of position of the mobile station. To sum up, the time parameter should, to effect a minimization of this signalling load, have a comparatively big value when the mobile station is stationary or is moving slowly, and a comparatively small value when the mobile station is moving rapidly. According to the invention, an adaptive adjustment of the time parameter is attained by the value of the time parameter being set currently, depending on the actual speed of the mobile station through the cell network of the mobile telephone system. The value of the time parameter can be set or adapted for instance regularly, irregularly or in response to one in advance defined occurrence.

In a first embodiment of the procedure, the time parameter of the mobile station is given a predefined value at the entry of the mobile station into the mobile telephone system, and after that the time parameter is reduced at a cell update according to a predefined rule. This rule can, for instance, be so designed that the value of the time parameter is halved at a cell update, preferably at each such cell update. If the mobile station is moved at a high speed through the cell network, a lot of cell updates are executed, and by that a rapid reduction of the value of the time parameter. Consequently the time during which the mobile station is in the Ready State, and by that also the signalling load, is reduced.

In a second embodiment of the procedure, the time parameter of the mobile station is, as in the first embodiment, given a predefined value at the entry of the mobile station into the mobile telephone system. The speed of the mobile station through the cell network is estimated currently, and at cell update the estimated speed is reported to the network. After that, the speed of the mobile station is adapted according to a predefined rule which may be the same rule as is used at the entry of the mobile station into the system.

The time parameter can, for instance, be set according to a table in which different time parameters for different speed intervals are described. In the case that there are corresponding time parameters at the mobile station, respective the cell network, said time parameter at the mobile station and said corresponding time parameter at the cell network are changed essentially at the same time.

Speed estimation can be performed in one in itself known way, for instance as is described in any of the publications: M. Andersin, "An Algorithm for Mobile Speed Estimation in Cellular Networks", Technical Report, 5/0363-04/FCPA 109 0001, Telia Research, January 1997; A. Sampath and J. M. Holtzman; "Estimation of Maximum Doppler Frequency for Handoff Decisions", Proceedings: IEEE 43rd Vehicular Technology Conference, VTC-93, pp. 859-862, Secaucus, N.J., May 1993; or Ling Wang, Marko Silventoinen, Zhichun Honkasalo; "A New Algorithm For Estimating Mobile Speed at the TDMA-based Cellular System", Nokia Research Center, Heikkilantie 7, SF-00211 Helsinki, Finland.

Figure 2:
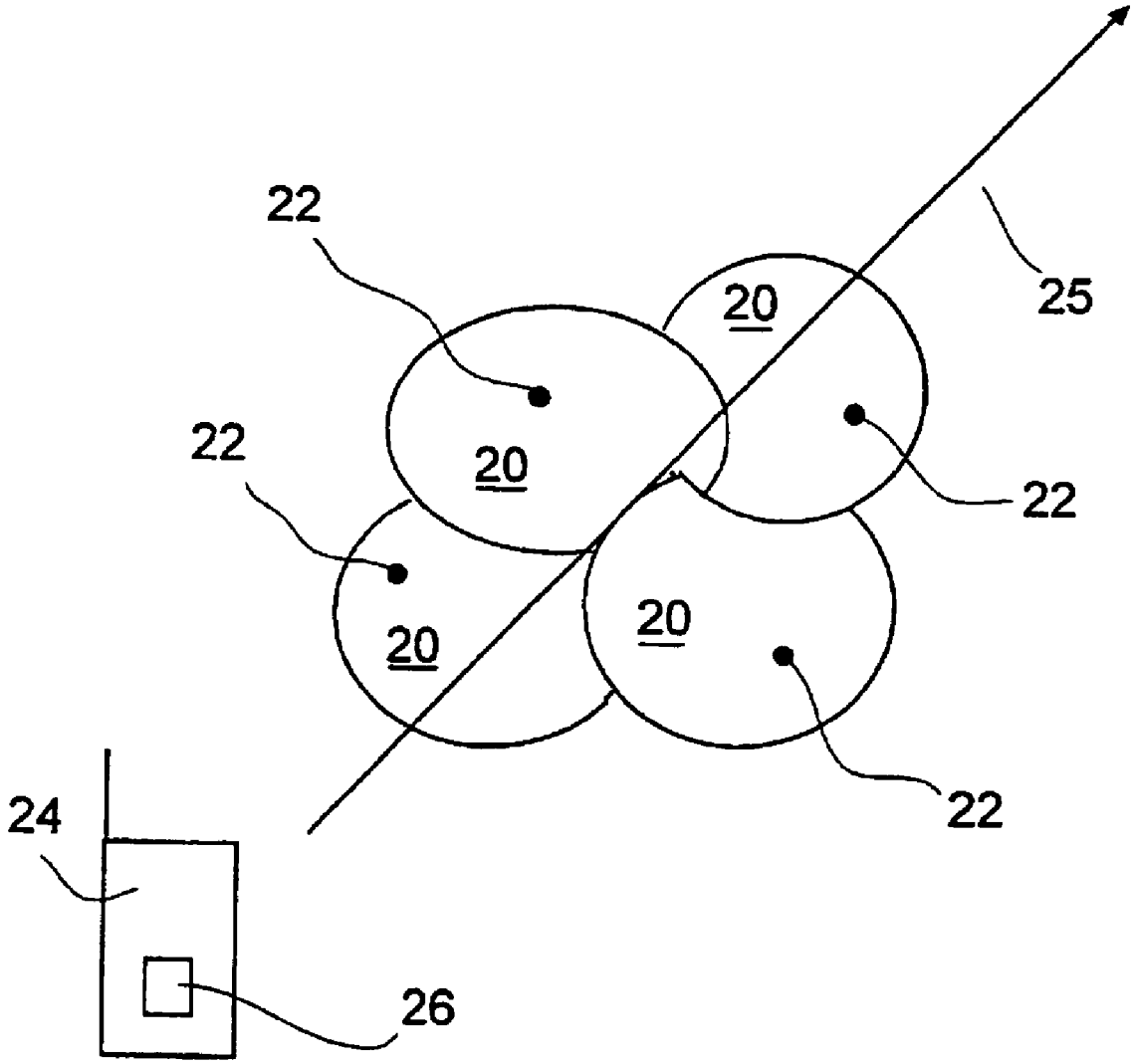
FIG. 2 illustrates a sketch of the principle of a cellular mobile telephone system according to the invention.

Mobile Telephone System and Mobile Station:

FIG. 2 illustrates the principle of a cellular mobile telephone system 18 which supports packet switched services. The system includes a network of cells 20 which are served by a base station 22 for each. One in the mobile telephone system included mobile station 24 is transferred through the cell network according to a speed vector 25. According to what has been described above, the mobile station is switched between a first mode in a first state, here called Ready State, respective a second mode, here called Standby State, depending on a time parameter which indicates a time during which the mobile station shall remain in the first state in order to after that switch to the second state. A mobile telephone system and/or a mobile station according to the invention, includes means 26 to currently set the size of the time parameter or value depending on the current speed of the mobile station through the cell network of the mobile telephone system.

The in the system included means for execution of the procedure according to the invention to some extent exists in a base station 22 or in a mobile station 24. Actually there are, for most of the means, cooperating and possibly communicating devices on the one hand in the base station, and on the other in the mobile station, and how these devices are allocated, depend on the selection of implementation. For the sake of clarity are in the following FIGS. 3A, 3B, 3C shown both a base station 22 and a mobile station 24 equipped with said means.

Figure 3A:
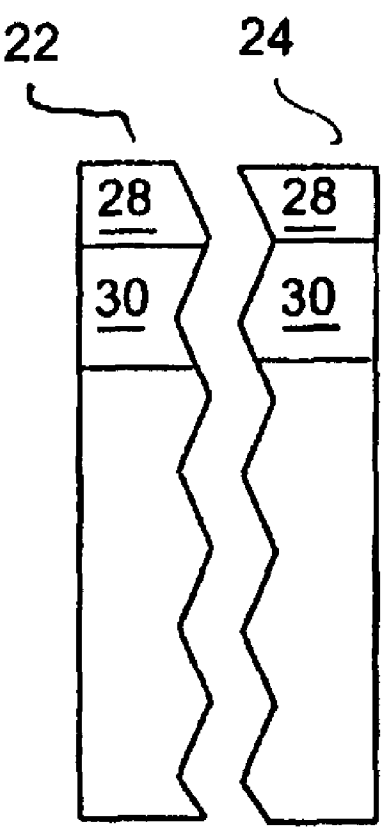
FIGS. 3A, 3B and 3C illustrates the principle of a base station, respective a mobile station, according to the invention.

FIG. 3A shows in principle a first embodiment of a base station 22, respective a mobile station, which includes means 28 to allocate to the time parameter of the mobile station a predefined value at the entry of the mobile station into the mobile telephone system, and means 30 to, at a cell update reduce the value of the time parameter according to a predefined rule. For instance, the value of the time parameter can be halved at a cell uppdate, preferably, but not necessary, at each cell update.

Figure 3B:
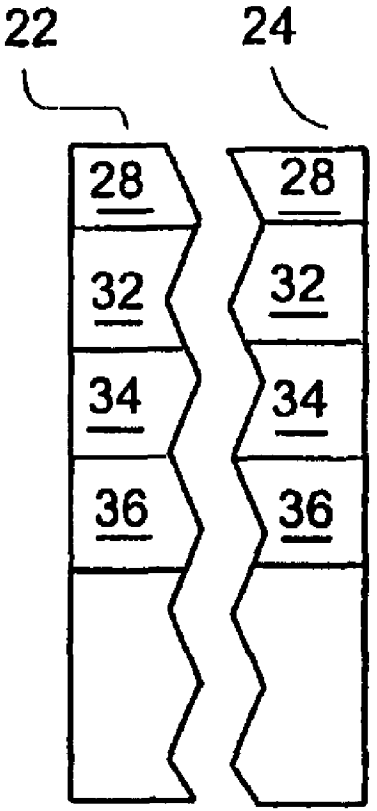

FIG. 3B illustrates a second embodiment including means 28 for allocating the time parameter of the mobile station a predefined value at the entry of the mobile station into the mobile telephone system, means 32 to currently estimate the speed of the mobile station through the cell network, means 34 to report an estimated speed to the network at cell update, and means 36 to adapt the value of the time parameter to the speed of the mobile station according to a predefined rule.

Figure 3C:
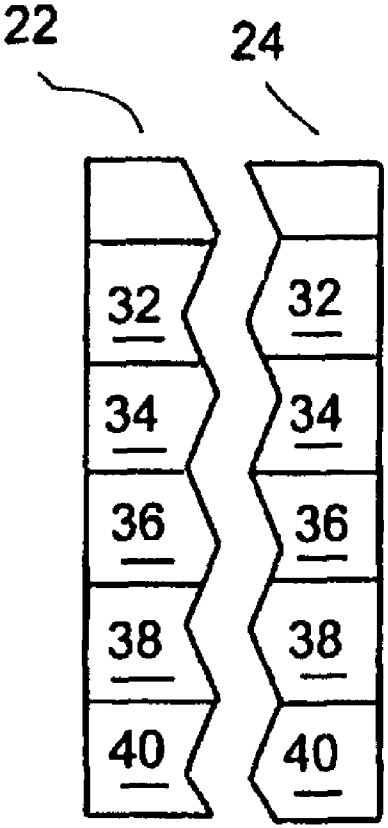

FIG. 3C illustrates a third embodiment including means 38 to report an estimated speed of the mobile station at its entry into the mobile telephone system, means 40 to set the time parameter of the mobile station according to a pre-defined rule depending on the speed, means 32 to currently estimate the speed of the mobile station through the cell network, and means 34 to, at cell update, report the estimated speed to the network, and means 36 to adapt the value of the time parameter to the speed of the mobile station according to a predefined rule. Possibly, but not necessarily, the means 36 and 40 can be the same.

In different embodiments the time parameter is set according to a table in which different time parameters for different time intervals are described. To the extent that said time parameter has a corresponding time parameter in the cell network, these are changed essentially at the same time.

What is claimed is:

1. Procedure to reduce the signalling load in a cellular mobile telephone system which supports packet switched services, comprising:

switching one of a plurality of mobile stations in the cellular mobile telephone system between a first mode in a first state, respective to a second state depending on a time parameter which indicates a time during which the mobile station shall remain in the first state in order to after that change to the second state; and setting the value of the time parameter depending on a current speed of the mobile station through a cell network of the cellular mobile telephone system.

2. Procedure to set a time parameter in a cellular mobile telephone system which supports packet switched services, comprising:

switching one of a plurality of mobile stations in the cellular mobile telephone system between a first mode in a first state respective to a second state, depending on said time parameter which indicates a time during which the mobile station shall remain in the first state in order to after that change to the second state; and setting currently the value of the time parameter depending on a current speed of the mobile station through a cell network of the cellular mobile telephone system.

3. Procedure according to claim 1, further comprising:

allocating a predefined value to the time parameter of the mobile station when a mobile station enters the cellular mobile telephone system; and reducing the time parameter according to a predefined rule when a cell update occurs.

4. Procedure according to claim 3, wherein the value of the time parameter is halved at a cell update.

5. Procedure according to claim 1, further comprising:

allocating a predefined value to the time parameter of the mobile station when a mobile station enters the cellular mobile telephone system;

estimating currently the speed of the mobile station through the cell network;

reporting the currently estimated speed to the cell network when a cell update occurs; and adapting the time parameter of the mobile station according to a predefined rule.

6. Procedure according to claim 1, further comprising:

reporting an estimated speed of the mobile station when a mobile station enters the cellular mobile telephone system;

setting the time parameter of the mobile station according to a predefined rule depending on the estimated speed;

estimating currently the speed of the mobile station through the cell network;

reporting the currently estimated speed to the cell network when a cell update occurs; and adapting an actual speed of the mobile station according to a predefined rule after the reporting.

7. Procedure according to claim 5, wherein the time parameter is set according to a table in which different time parameters for different speed intervals are described.

8. Procedure according to claim 1, wherein the time parameter of the mobile station and a corresponding time parameter of the cellular network are changed essentially at the same time.

9. A cellular mobile telephone system which supports packet switched services, comprising:

means for currently setting a value of a time parameter depending on a current speed of a mobile station through a cell network of a cellular mobile telephone system, wherein one of a plurality of mobile stations included in the cellular mobile telephone system is switched between a first mode in a first state respective to a second state depending on the time parameter that indicates a time when the one of the plurality of mobile stations shall remain in the first state to thereafter change to the second state.

10. Mobile telephone system according to claim 9, further comprising:

means for allocating a predefined value to the time parameter of the mobile station at the entry of the mobile station into the mobile telephone system; and means for reducing the value of the time parameter according to a predefined rule.

11. Mobile telephone system according to claim 10, wherein the value of the time parameter is halved at a cell update.

12. Mobile telephone system according to claim 9, further comprising:

means for allocating a predefined value to the time parameter of the mobile station at the entry of the mobile station into the mobile telephone system;

means for estimating currently the speed of the mobile station through the cell network;

means for reporting the currently estimated speed to the network at a cell update; and means for adapting the time parameter to the currently estimated speed of the mobile station according to a predefined rule.

13. Mobile telephone system according to claim 9, further comprising:

means for reporting an estimated speed of the mobile station at its entry into the mobile telephone system;

means for setting the time parameter of the mobile station according to a predefined rule depending on the estimated speed;

means for estimating currently the speed of the mobile station through the cell network;

means for reporting the currently estimated speed to the cell network when a cell update occurs; and means for adapting the time parameter to the currently estimated speed of the mobile station according to a predefined rule.

14. Mobile telephone system according to claim 12, wherein the time parameter is set according to a table in which different time parameters for different time intervals are described.

15. Mobile telephone system according to claim 9, wherein the time parameter of the mobile station and a corresponding time parameter of the cell network are changed essentially at the same time.

16. A mobile station included in a cellular mobile telephone system which supports packet switched services, comprising:

means for setting currently a value of a time parameter depending on a current speed of the mobile station through a cell network of the cellular mobile telephone system, wherein one of a plurality of mobile stations included in a cellular mobile telephone system is switched between a first mode in a first state respective to a second state depending on the time parameter that indicates a time when the one of the plurality of mobile stations shall remain in the first state to thereafter change to the second state.

17. Mobile station according to claim 16, further comprising:

means for allocating a predefined value to the time parameter of the mobile station at the entry of the mobile station into the cellular mobile telephone system; and means for reducing the time parameter according to a predefined rule when a cell update occurs.

18. Mobile station according to claim 17, wherein the value of the time parameter is halved at a cell update.

19. Mobile station according to claim 16, further comprising:

means for allocating a predefined value to the time parameter of the mobile station at the entry of the mobile station into the cellular mobile telephone system;

means for estimating currently the speed of the mobile station through the cell network;

means for reporting the currently estimated speed to the network at cell update; and means for adapting the time parameter to the currently estimated speed of the mobile station according to a predefined rule.

20. Mobile station according to claim 16, further comprising:

means for reporting an estimated speed of the mobile station at its entry into the cellular mobile telephone system;

means for setting the time parameter of the mobile station according to a predefined rule, depending on the estimated speed;

means, for estimating currently the speed of the mobile station through the cell network;

means for reporting the currently estimated speed to the network when a cell update occurs; and means for adapting the time parameter to the currently estimated speed of the mobile station according to a predefined rule.

21. Mobile station according to claim 19, wherein the time parameter is set according to a table in which different time parameters for different speed intervals are described.

22. Mobile station according to claim 16, wherein said time parameter of the mobile station and a corresponding time parameter of the cell network are changed essentially at the same time.

23. A cellular mobile telephone system which supports packet switched services, comprising:

a time circuit configured to set a value of a time parameter depending on a current speed of a mobile station through a cell network of a mobile telephone system, wherein one of a plurality of mobile stations included in a cellular mobile telephone system is switched between a first mode in a first state respective to a second state depending on the time parameter that indicates a time when the one of the plurality of mobile stations shall remain in the first state to thereafter change to the second state.

24. Mobile telephone system according to claim 23, further comprising:

an allocator configured to allocate a predefined value to the time parameter of the mobile station at the entry of the mobile station into the mobile telephone system; and a reducer configured to reduce the value of the time parameter according to a predefined rule.

25. Mobile telephone system according to claim 24, wherein the value of the time parameter is halved at a cell update.

26. Mobile telephone system according to claim 23, further comprising:

an allocator configured to allocate a predefined value to the time parameter of the mobile station at the entry of the mobile station into the mobile telephone system;

an estimator configured to currently estimate the speed of the mobile station through the cell network;

a reporting unit configured to report an estimated speed to the network at a cell update; and an adapting unit configured to adapt the time parameter to the currently estimated speed of the mobile station according to a predefined rule.

27. Mobile telephone system according to claim 23, further comprising:

a reporting unit configured to report an estimated speed of the mobile station at its entry into the mobile telephone system;

a setting unit configured to set the time parameter of the mobile station according to a predefined rule depending on the estimated speed;

an estimator configured to currently estimate the speed of the mobile station through the cell network;

a reporting unit configured to report the currently estimated speed to the cell network when a cell update occurs; and an adapting unit configured to adapt the time parameter to the currently estimated speed of the mobile station according to a predefined rule.

28. Mobile telephone system according to claim 26, wherein the time parameter is set according to a table in which different time parameters for different time intervals are described.

29. Mobile telephone system according to claim 23, wherein the time parameter of the mobile station and a corresponding time parameter of the cell network are changed essentially at the same time.

30. A mobile station included in a cellular mobile telephone system which supports packet switched services, comprising:

a setting unit configured to currently set the value of a time parameter depending on a current speed of the mobile station through a cell network of the cellular mobile telephone system, wherein one of a plurality of mobile stations included in a cellular mobile telephone system is switched between a first mode in a first state respective to a second state depending on the time parameter that indicates a time when the one of the plurality of mobile stations shall remain in the first state to thereafter change to the second state.

31. Mobile station according to patent claim 30, further comprising:

an allocator configured to allocate a predefined value to the time parameter of the mobile station at the entry of the mobile station into the cellular mobile telephone system; and a reducer configured to reduce the time parameter according to a predefined rule when a cell update occurs.

32. Mobile station according to claim 31, wherein the value of the time parameter is halved at a cell update.

33. Mobile station according to claim 30, further comprising:

an allocator configured to allocate a predefined value to the time parameter of the mobile station at the entry of the mobile station into the cellular mobile telephone system;

an estimator configured to estimate the speed of the mobile station through the cell network;

a reporting unit configured to report an estimated speed to the network at the cell update; and an adapting unit configured to adapt the time parameter to the estimated speed of the mobile station according to a predefined rule.

34. Mobile station according to claim 30, further comprising:

a reporting unit configured to report an estimated speed of the mobile station at its entry into the mobile telephone system;

a setting unit configured to set the time parameter of the mobile station according to a predefined rule, depending on the estimated speed;

an estimator configured to currently estimate the speed of the mobile station through the cell network;

a reporting unit configured to report the currently estimated speed to the network when a cell update occurs; and an adapting unit configured to adapt the time parameter to the currently estimated speed of the mobile station according to a predefined rule.

35. Mobile station according to claim 33, wherein the time parameter is set according to a table in which different time parameters for different speed intervals are described.

36. Mobile station according to claim 30, wherein said time parameter of the mobile station and a corresponding time parameter of the cell network are changed essentially at the same time.

*37. An article of manufacture including a memory having instructions stored thereon that, if executed by a computing device, cause the computing device to perform operations comprising:*

*setting a value of a time parameter based at least in part on a mobility of a mobile station in a mobile telephone system, wherein the mobile station is capable of switching from a first state to a second state based at least in part on the value of the time parameter, and*

*adapting the time parameter in response to a change in the mobility of the mobile station.*

*38. The article of manufacture of claim 37, wherein the operations further comprise:*

*allocating a predefined value to the time parameter of the mobile station at the entry of the mobile station into the mobile telephone system; and*

*reducing the time parameter according to a predefined rule in response to a cell update.*

*39. The article of manufacture of claim 38, wherein the value of the time parameter is halved at a cell update.*

*40. The article of manufacture of claim 37, wherein the operations further comprise:*

*allocating a predefined value to the time parameter of the mobile station at the entry of the mobile station into the mobile telephone system;*

*estimating a speed associated with the mobile station; and*

*modifying the time parameter of the mobile station according to a predefined rule.*

*41. A base station configured to:*

*set, at the base station, a value of a time parameter based at least in part on a mobility of a mobile station in a mobile telephone system, wherein the mobile station is capable of switching from a first state to a second state based at least in part on the value of the time parameter; and*

*adapt, at the base station, the time parameter in response to a change in the mobility of the mobile station.*

*42. The base station of claim 41, wherein the base station is further configured to:*

*assign a predefined value to the time parameter of the mobile station in response to the mobile station registering with the mobile telephone system; and*

*reduce the time parameter according to a predefined rule in response to a cell update.*

*43. The base station of claim 41, wherein the base station is further configured to:*

*assign a predefined value to the time parameter of the mobile station in response to the mobile station registering with the mobile telephone system;*

*estimate a speed associated with the mobile station; and*

*modify the time parameter of the mobile station according to a predefined rule.*

*44. The base station of claim 41, wherein the time parameter is set according to a table in which different time parameters for different mobility intervals are described.*

*45. The base station of claim 43, wherein the base station is further configured to report the estimated speed in response to a cell update.*

*46. A method comprising:*

*setting, at a base station, a value of a time parameter based at least in part on a mobility of a mobile station in the mobile telephone system, wherein the mobile station is capable of switching from a first state to a second state based at least in part on the value of the time parameter, and*

*adapting, at the base station, the time parameter in response to a change in the mobility of the mobile station.*

*47. The method of claim 46, further comprising:*

*allocating a predefined value to the time parameter of the mobile station upon registration of the mobile station with the mobile telephone system; and*

*reducing the time parameter according to a predefined rule in response to a cell update.*

*48. The method of claim 47, wherein the value of the time parameter is halved at a cell update.*

*49. The method of claim 46, further comprising:*

*allocating a predefined value to the time parameter of the mobile station upon registration of the mobile station with the mobile telephone system;*

*estimating a speed associated with the mobile station; and modifying the time parameter of the mobile station according to a predefined rule.*

* * * * *

UNITED STATES PATENT AND TRADEMARK OFFICE

CERTIFICATE OF CORRECTION

PATENT NO. : RE42,411 E
APPLICATION NO. : 11/316599
DATED : May 31, 2011
INVENTOR(S) : Ayoub et al.

It is certified that error appears in the above-identified patent and that said Letters Patent is hereby corrected as shown below:

Column 7, line 45, in Claim 19, delete “at cell update;” and insert -- at a cell update; --.

Column 7, line 58, in Claim 20, delete “means, for” and insert -- means for --.

Column 9, line 12, in Claim 31, delete “patent claim” and insert -- claim --.

Signed and Sealed this
First Day of November, 2011

David J. Kappos

David J. Kappos
*Director of the United States Patent and Trademark Office*